INVENTOR
KARL WILFERT

June 23, 1970   K. WILFERT   3,516,707
MOTOR VEHICLE BODY

Filed Sept. 8, 1967   3 Sheets-Sheet 2

INVENTOR
KARL WILFERT

BY Craig & Antonelli

ATTORNEYS

June 23, 1970  K. WILFERT  3,516,707
MOTOR VEHICLE BODY
Filed Sept. 8, 1967  3 Sheets-Sheet 3

INVENTOR
KARL WILFERT

BY Craig & Antonelli
ATTORNEYS 3,516,707
MOTOR VEHICLE BODY
Karl Wilfert, Gerlingen-Waldstadt, Germany, assignor to Daimler-Benz Aktiengesellschaft, Stuttgart-Unterturkheim, Germany
Filed Sept. 8, 1967, Ser. No. 666,387
Claims priority, application Germany, Sept. 8, 1966, D 51,055; Nov. 11, 1966, D 51,525
Int. Cl. B60j 1/20
U.S. Cl. 296—91                                   10 Claims

ABSTRACT OF THE DISCLOSURE

A motor vehicle body which includes a windshield and a body structure located in front thereof, especially for passenger motor vehicles, in which the windshield and/ or other parts of the vehicle are kept substantially free of dust and dirt by providing apertures in the body structure in front of the windshield through which either at least a part of the dynamic air flow, which would normally flow against the windshield and/or other part to be kept clean, is sucked off into and through the vehicle body or an additional air stream or air flow is blown directly toward the windshield and/or other vehicle wall to be kept clean.

BACKGROUND OF THE INVENTION

The present invention relates to a motor vehicle body with a windshield and with a body pre-structure arranged in front of the windshield, especially for passenger motor vehicles.

Known motor vehicle bodies of the prior art entail the disadvantage that the windshield window becomes very dirty or dusty, especially when dusty or wet roads dampened by rains are travelled over. Since this shortcoming could be eliminated only partly by the windshield wipers generally provided in passenger motor vehicles, the present invention aims at avoiding by other means a dirtying or dustying in particular of the windshield panes.

SUMMARY OF THE INVENTION

Starting with the recognition that for the solution of the underlying aim, the air stream or flow in front of the windshield pane or of the vehicle wall to be kept clean has to be influenced, the present invention essentially consists in that apertures are provided in the vehicle outer body panels, preferably in the body pre-structure within the area of the windshield, through which apertures either at least a portion of the air stream flowing against the windshield or against the vehicle wall in question is sucked off through the vehicle body or an additional air stream is blown directly toward the windshield or such vehicle wall. It can be achieved in this manner that the air, for example, enriched with dust or dirt is far-reachingly prevented from a contact with the windshield because it is either deflected into other paths prior to reaching the windshield pane or is deflected upwardly by a sort of air curtain in front of the windshield pane.

The present invention can be further developed in a particularly advantageous manner in that the apertures in front of the windshield are connected with air-guide channels or ducts which either terminate within areas of the body, in which prevails a vacuum during the drive so that a suction effect is exerted at the air inlet apertures during the drive, or that the air-guide channels or ducts begin at such places at which prevails an excess pressure during the drive; in that case, a discharge blower effect occurs at the air discharge apertures. Since such an arrangement of the air-guide channels is able to produce generally only slight air flows, it is appropriate if, for the production or for the assistance of the air flows, blowers are provided in the air-guide channels with the aid of which the suction flow or discharge flow, as the case may be, can be brought to the desired strength.

An advantageous construction is obtained if two airinlet apertures are provided in front of the windshield whose air-guide channels lead inside of the vehicle approximately V-shaped downwardly to a common discharge channel which becomes wider in a diffuser-like manner in the direction toward the vehicle floor because this construction is relatively space-saving. In an appropriate manner the discharge channel may terminate to the rear—as viewed in the direction of flow—of a recessed step in the body floor so that the discharge is located within an area of the body in which a vacuum occurs during the drive. It is particularly advantageous if two discharge channels are provided which terminate each to the rear—as viewed in the direction of flow—of recessed steps at the lateral surfaces of the body because in this manner there is achieved, in addition to a relatively good vacuum effect or suction effect at the discharge of the outlet or discharge channels, the still further advantage that in addition to the windshield, also the lateral walls of the body can be protected far-reachingly against becoming dirty or dusty. The air masses discharge at the lateral surfaces, which were sucked off or drawn off in front of the windshield, are generally freed along their path through the body of dirt and dust and form a protective curtain against the soiled air flows at the sides of the vehicle. In case of need, however, special filtering installations or the like of any conventional construction may also be provided for the purpose of cleaning the sucked-off air prior to discharge thereof.

Another, equally advantageous construction of the present invention can be obtained if one or several air-outlet or air-discharge apertures are provided in the vehicle outer body panels in front of the windshield which are operatively connected with at least one air-guide channel or duct beginning at the front end of the body, because an assurance then exists in that case that the dynamic air pressure occurring during the drive at the front end of the body can be utilized for the supply of the air in the direction toward the windshield.

A particularly favorable embodiment is realized if two lateral air-guide channels arranged inside of the body are each provided with one respectively inlet aperture at the front end of the body. With this type of construction as well as with all other constructions mentioned herein, a particularly favorable and appropriate combination with the engine-cooling installation generally provided in passenger motor vehicles can be achieved if the air-guide channels for drawing-off the air in front of the windshield or for blowing air thereagainst are provided with heat exchangers for the cooling of the engine cooling water and if additionally these air guide channels are connected with the conventional air-guide channels for venting and/or heating the vehicle interior and are adapted to be closed off with respect thereto in a conventional manner by closure devices. The air masses heated by the engine radiators or coolers can be made useful by this construction for heating purposes. It is possible in connection therewith to preclude the soiling of the windshield in a far-reaching manner as well as to simplify considerably the all-weather heating and air-conditioning system of the motor vehicle because the heated air masses, for example, with the first-described embodiment of which the dynamic air flow is sucked off in front of the windshield, can be withdrawn directly downstream of the cooler for the vehicle heating system arranged in the air-guide channels so that heat losses due to long airguide channels are eliminated.

It has been additionally discovered that the air flow or air stream directed against the windshield and/or against the vehicle parts to be kept clean or the air stream or flow sucked off in front of the windshield not only is able to prevent a soiling but that a particularly favorable maintenance as regards cleanliness of vehicle parts takes place if the apertures in the vehicle body pre-structure, described hereinabove, are constructed as discharge blower nozzle or slots or the like which direct the air flow upwardly in front of the windshield and/or the vehicle walls to be kept clean. The air stream or air flow enriched with dust or dirt is thereby blown off already prior to reaching the windshield and/or other vehicle parts to be kept clean in such a manner that practically no soiling occurs any longer.

Particularly advantageous is thereby a construction in which the air stream or flow is blown out or discharged directly forwardly at an angle of about 30° to the vertical because with this construction, in addition to a completely satisfactory keeping-clean of the corresponding vehicle parts, also the air resistance coefficient for the streamlining of the motor vehicle can be reduced. It has further been discovered to be favorable if the discharge slots or the like are accommodated directly in front of the windshield and/or the vehicle walls to be kept clean.

Accordingly, it is an object of the present invention to provide a vehicle body construction which eliminates by simple means the aforementioned shortcomings encountered with the prior art constructions.

Another object of the present invention resides in a motor vehicle body which effectively prevents, by extremely simple means, the soiling of the windshield and/or other vehicle parts.

A further object of the present invention is a simple and space-saving installation for motor vehicle bodies which effectively keeps the road dirt and dust away from the windshield and/or other vehicle outer wall surfaces.

Still another object of the present invention resides in an installation in motor vehicle bodies, especially in passenger motor vehicles, which keeps the windshield as well as lateral wall parts of the vehicle free of dust and dirt.

Still another object of the present invention resides in an installation of the aforementioned type which is not only reliable in operation and relatively inexpensive in cost but which additionally permits considerably simplification in the heating and ventilating system of the motor vehicle.

A further object of the present invention resides in a system for keeping certain parts of a motor vehicle free from dust and dirt which, at the same time, reduces the air resistance coefficient of the vehicle.

These and further objects, features and advantages of the present invention will become more obvious from the following description, when taken in conjunction with the accompanying drawing, showing, for purposes of illustration only, several embodiments in accordance with the present invention, and wherein:

FIG. 4 is a schematic longitudinal cross-sectional view through the motor vehicle of FIGURE 3a;

Figure 1:
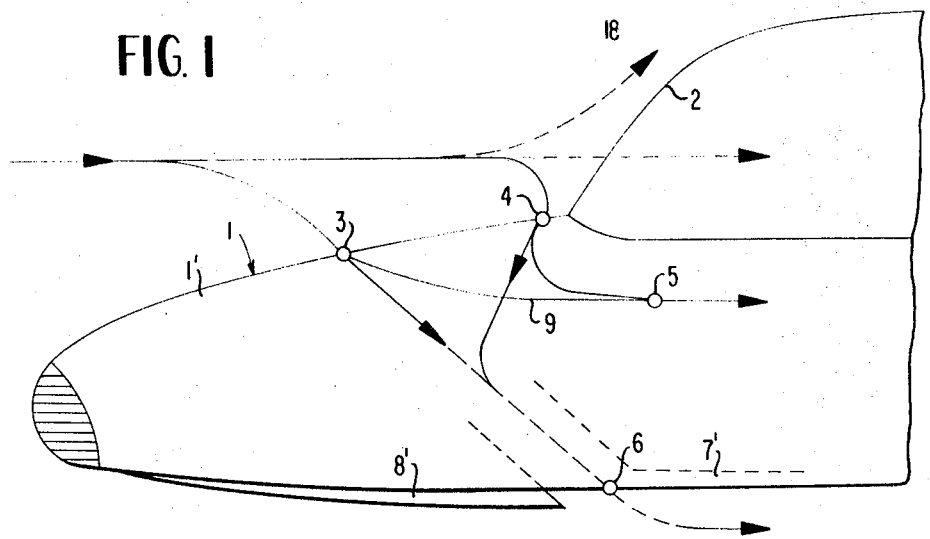
FIG. 1 is a schematic side elevational view of a motor vehicle in accordance with the present invention and indicating the basic possibilities of the arrangement of the air-inlets and air-outlets in front of the windshield and/or at the body lateral surfaces and at the body floor according to this invention.

Referring now to the drawing wherein like reference numerals are used throughout the various views to designate like parts, and more particularly to FIG. 1, reference numeral 1 generally designates therein a motor vehicle body of any conventional construction which includes a body pre-structure 1' and a windshield 2. The basic possibilities of the air guidance according to the present invention are illustrated in one single embodiment in which apertures for sucking off the air are provided in the vehicle outer body panels in front of the windshield 2. The air-inlet apertures may, as indicated by reference numeral 3, be arranged at a relatively large distance in front of the windshield 2; however, they may also be located directly in front of the windshield 2 as indicated by reference numeral 4. It can be readily seen from FIG. 2 that these inlet apertures may be arranged in the center longitudinal plane of the motor vehicle; however, they may also be arranged in the lateral areas of the vehicle body 1, as indicated by reference numerals 3' and 4'. Of course, a combination of apertures arranged laterally and in the longitudinal center plane of the vehicle is also within the purview of the present invention.

Figure 2:
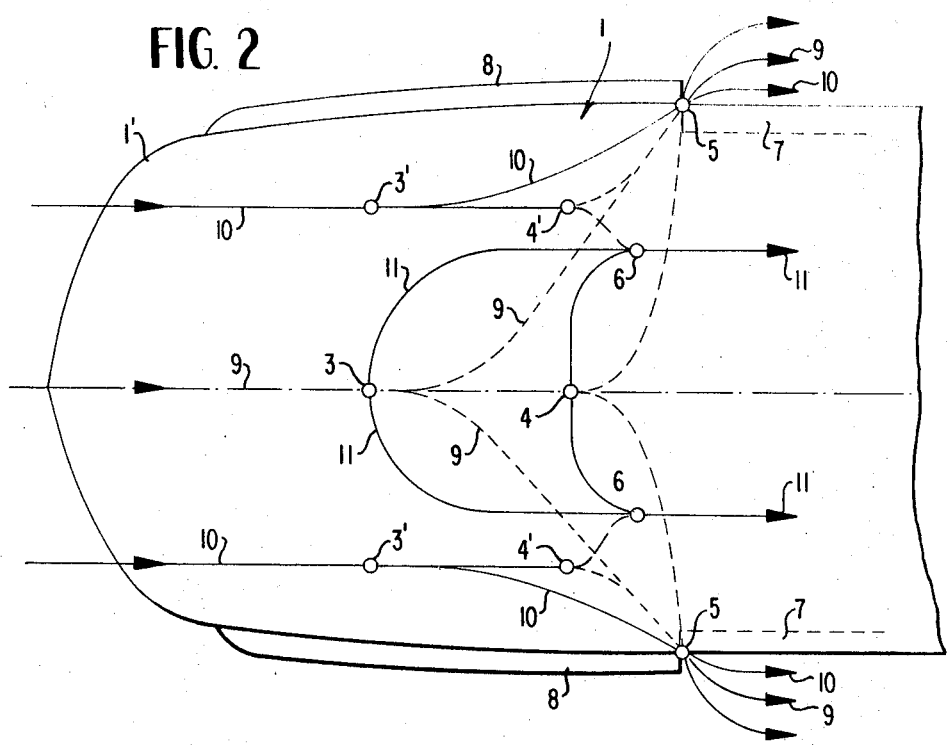
FIG. 2 is a top plan view on the vehicle body schematically illustrated in FIG. 1.

As can be further seen from FIGS. 1 and 2, two basic possibilities exist as regards the arrangement of the outlet apertures 5 and 6 corresponding to the inlet apertures 3 and 4 and the inlet apertures 3' and 4', respectively. The outlet apertures 5 may be arranged, for example, at the forward door joint in the lateral surfaces of the body. This air outlet 5 may thereby be so located and placed that it is located in the lateral surfaces of the body within the area of a recessed step 7, as viewed in the direction of flow according to the illustrated arrows. The advantage is achieved thereby that a relatively large vacuum occurs at the outlet or discharge aperture 5 during the drive which is able to exert a suction effect on the inlet apertures 3 and/or 4. In lieu of or in combination with the step 7, step 8 projecting outwardly beyond the contour of the body 1 may also be provided which contributes to the assistance of the described effect.

If, for example, the inlet aperture 8 is now chosen in the longitudinal center plane of the body in connection with the outlet apertures 5, then the flow of the deflected dynamic air stream or flow takes place through the body 1 along the stream line or flow line designated by reference numeral 9. If, instead of the inlet aperture 3 the inlet apertures 3' are selected, then the entering dynamic air flow is deflected along the paths indicated by reference numerals 10. The air is conducted in an analogous manner to the outlet apertures 5 if it enters through the inlet apertures 4 and/or 4'.

However, it is also possible to arrange, in lieu of the outlet or discharge apertures 5 in the lateral surfaces of the body, the outlet or discharge apertures 6 at the lower pedal floor and/or in the center tunnel. The deflected dynamic air flow then proceeds, for instance, from the inlet aperture 3 according to the arrows 11 to the outlet or discharge aperture or apertures 6 (FIG. 2), and in an analogous manner from the inlet apertures 3' and/or 4 and/or 4'. Of course, it is also possible to arrange inlet apertures at the places designated by reference numerals 3 and/or 4 and outlet apertures both at the places designuated by reference numerals 5 as well as at those designated by reference numerals 6. In the embodiment of FIG. 1, the outlet or discharge aperture 6 termiates, analogous to the apertures 5, behind a projecting step 8' provided at the body floor and/or within an area recessed with respect to the remainder of the body floor.

Figure 3A:
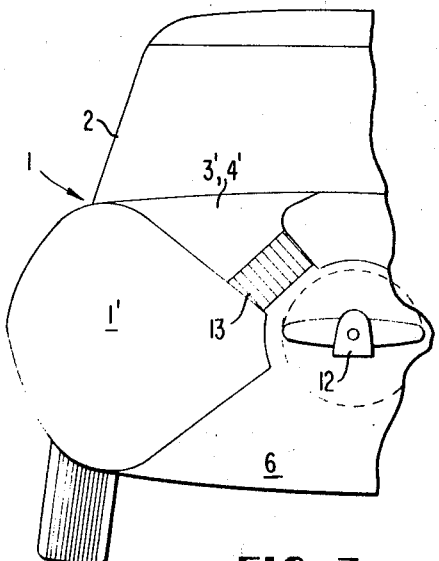
FIG. 3a is a schematic front elevational view of the right half of one embodiment of a motor vehicle body constructed in accordance with the present invention utilizing, in principle, the arrangement shown in FIGS. 1 and 2, in which the dynamic air-flow occurring during the drive is sucked off in front of the windshield and deflected in the downward direction.
Figure 3B:
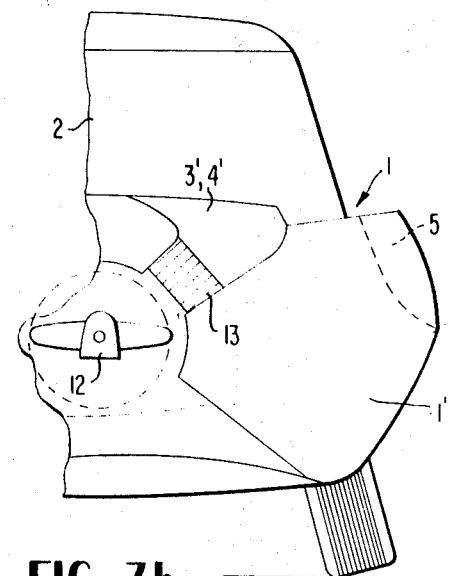
FIG. 3b is a schematic front elevational view of the left half of another embodiment of a motor vehicle body constructed in accordance with the present invention utilizing, in principle, the arrangement shown in FIGS. 1 and 2, in which the dynamic air-flow occurring during the drive is sucked off in front of the windshield and deflected toward the sides.

In the embodiments according to FIGS. 3a and 3b the air inlet apertures 3' and 4' are arranged within the area in front of the windshield 2 and lead in a V-shaped manner to a conventional blower arranged centrally within the body. Heat-exchangers 13 are provided in each of the air-guide channels upstream of the blower 12 which serve for the cooling of engine cooling water. The air entering at the apertures 3' and 4' is conducted in these embodiments through the heat-exchangers 13 to the blower 12 and from there through the outlet apertures 6 in a downward direction. It is noted that the axis of the blower 12, indicated vertical in FIGS. 3a and 3b, may also be arranged disposed at an inclination, in the longitudinal or transverse direction and may adapt itself to the given requirements of the air guide means.

In the embodiment of FIG. 3b there is provided, in addition to the air discharge at the motor vehicle body underside or in lieu of this discharge aperture at the lateral surfaces of the motor vehicle, the step 7 with the air outlet or discharge aperture 5 indicated in FIGS. 1 and 2, by means of which a soiling of the lateral surfaces of the motor vehicle can be partly avoided.

Figure 4:
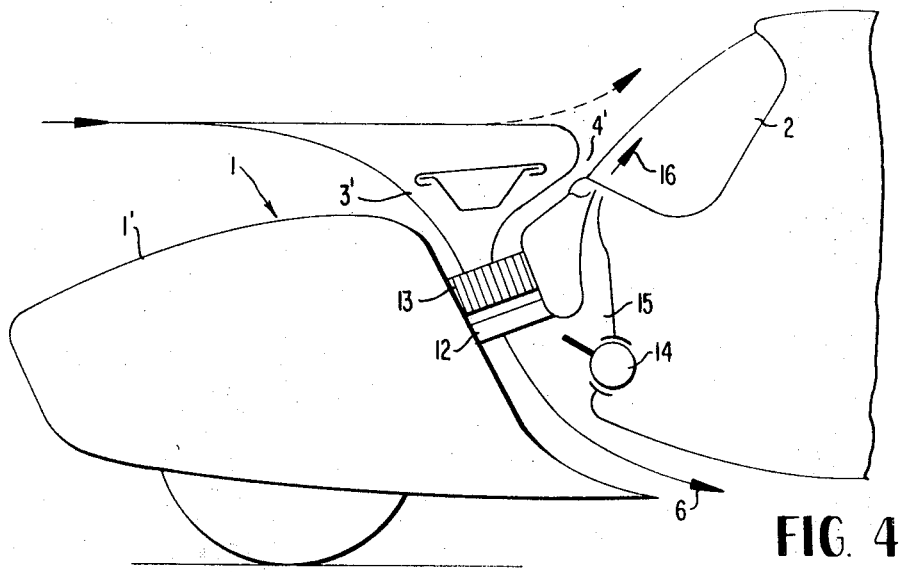

It can be seen from FIG. 4 how the heat-exchanger 13 is arranged within the body 1. The air can enter in this embodiment through the apertures 3' and 4' and, depending on the position of the closure member 14, is conducted either exclusively to the outlet aperture(s) 6 or is guided against the inside of the windshield 2 in the direction of the arrow 16 through the air-guide line 15 in communication with the air guide channel 3, 4, 6. Inlet apertures leading to the vehicle interior may also be connected with the closure member 14 which may be accommodated in a known manner in proximity of the floor.

Figure 5:
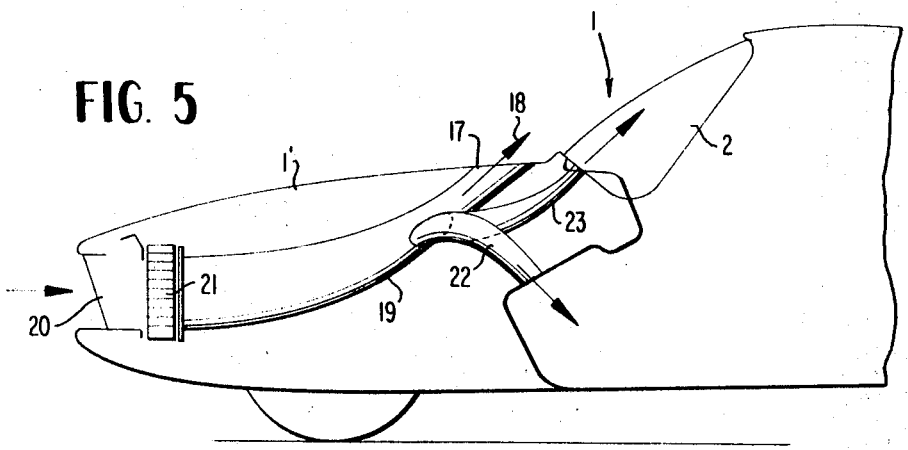
FIG. 5 is a schematic longitudinal cross-sectional view through a modified embodiment of a vehicle body constructed in accordance with the present invention in which the windshield is blown at from in front thereof in the manner of an air-curtain in addition to the dynamic air-flow occurring during the drive.

FIG. 5 illustrates another possibility of the construction according to the present invention, in which air outlet or discharge apertures 17 are arranged within the area in front of the windshield 2, through which a sort of air curtain can be blown in front of the windshield 2 in the direction of the arrow 18. Each air discharge aperture 17 is operatively connected with an air guide channel 19 whose inlet aperture 20 is located at the front end of the motor vehicle body 1. The heat-exchanger 21 is arranged a short distance downstream of the inlet aperture 20 which assumes in a conventional manner the cooling of the engine cooling water. The heat-exchanger may be additionally equipped with a blower which increases the effect of the dynamic pressure during the drive in front of the inlet aperture 20 so that a blowing discharge effect is achieved at the aperture 17. Additional air-guide channels 22 and 23 may be connected with the air-guide channel 19 which according to FIGS. 6a and 6b may be provided on both sides within the vehicle body. The additional air-guide channels 22 and 23 guide in a conventional manner either fresh-air or air preheated by the heat-exchanger for the purpose of temperature and climate control into the vehicle interior.

Figure 6A:
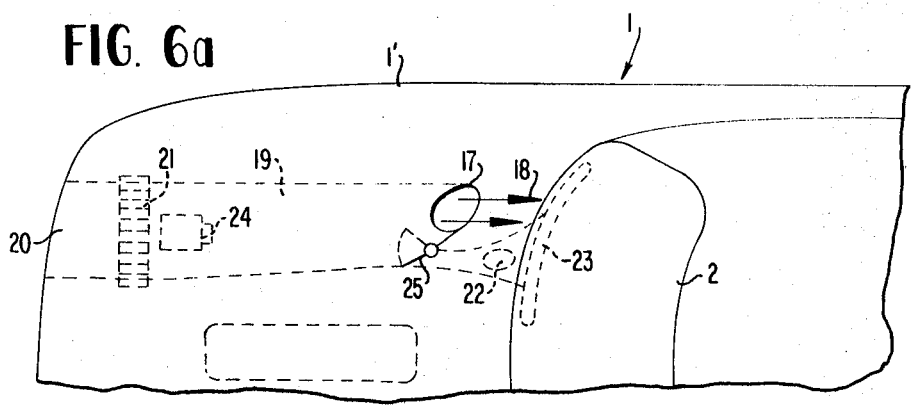
FIGS. 6a and 6b are partial plan views on the right half and left half, respectively, of the schematically illustrated vehicle body of FIGS. 5 and illustrating two possible modifications thereof.

In the embodiment according to FIG. 6a the heat-exchange 21 equipped with a blower 24 is ararnged within the air guide channel 19 which splits up within its area in front of the windshield 2 into a channel portion terminating at the discharge aperture 17 and into a channel portion, adapted to be closed off by conventional closure member 25, which passes over into the air-guide channels 22 and 23.

Figure 6B:
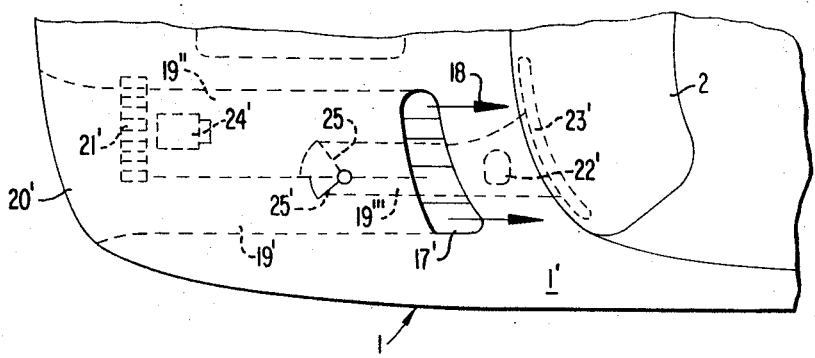

In contradistinction thereto, in the embodiment of FIG. 6b the air-guide channel is subdivided starting approximately at the air inlet aperture 20 into an air-guide channel 19'', in which is arranged a heat-exchanger 21' with a blower 24', and into an air-guide channel 19' without heat-exchanger. Within the area of the air-guide channels 19'' and 19' facing the windshield 2, a third air-guide channel 19''' is provided which, adapted to be closed by the closure devices 25 and 25', protrudes partly into the air-guide channel 19'' and partly into the air-guide channel 19'. It is possible with this arrangement to selectively blow both pre-heated as well as non-preheated air in the direction of the arrow 18 against the windshield; however, it is also possible to conduct selectively cold or preheated air through the air guide channel 19''' into the interior of the vehicle by way of air-guide channels 22' and 23'. However, it is further possible with this arrangement to utilize the air flows in any desired quantity and/or mixture ratio from the outside and/or from the inside for defrosting or dust-removal of the pane. Additionally, further fresh-air channels may be provided which may be utilized in an analogous manner for blowing against the windshield and/or for the ventilation of the interior space.

Figure 7:
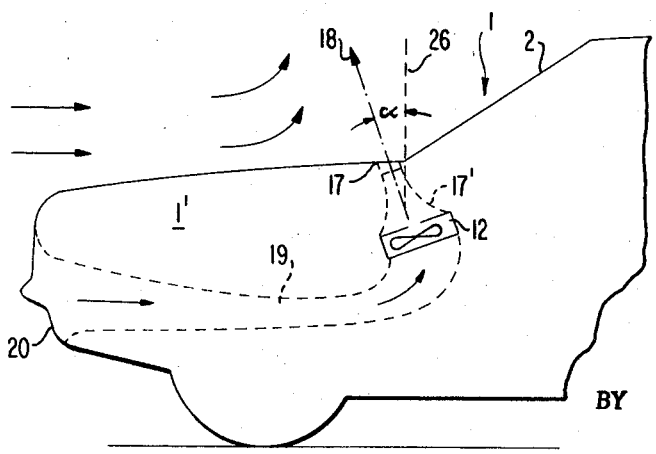
FIG. 7 is a schematic longitudinal cross-sectional view through a still further modified embodiment of a vehicle body in accordance with the present invention.

In the embodiment of FIG. 7, an air-guide channel 19 is arranged inside of a motor vehicle body 1, which sucks the air from an air-inlet aperture 20 into the interior of the vehicle body, for example, with the aid of a blower 12, and which blows out the air through the discharge slots or discharge nozzles 17 in the direction of the arrow 18 in the upward direction. The direction of the arrow 18 is thereby inclined in this embodiment forwardly opposite the driving direction at an angle $\alpha$ of about 30° with respect to the vertical plane indicated by reference numeral 26.

As mentioned hereinabove in FIG. 7, the constructive arrangement of the air-guide channels 19 (or 19', 19'', 19''') and the particular construction of the discharge apertures 17 may be chosen in accordance with any of the embodiments described above. The discharge apertures may be constructed, for instance, in the form of conventional nozzles, which produce defined jets or streams, or in the form of conventional discharge blower slots, which expel or blow out wide jets or streams as protective curtain in front of the windshield 2. The air-guide channel 19 may be constructed as single channel located in the center longitudinal plane of the vehicle which branches out to the various individual discharge apertures 17. However, two parallel air-guide channels may start from the front end of the vehicle or from other places of the motor vehicle which serve for the guidance of the air. It is only important that the air discharge takes place in front of the vehicle parts to be kept clean—in this embodiment the windshield—in a direction opposite the driving direction or only directly upwardly in the vertical direction.

If, for example, air streams are blown out of a discharge aperture 17 in front of the windshield 2 in the direction of the arrow 18, when the air discharge apertures 17 are constructed as a wide, nozzle-shaped slot, as indicated by reference numeral 17', which extends parallel to the windshield pane, and if air is blown out of these slots with a high velocity (in a 1.5 scale model, air was blown out, for example, with a velocity greater than 65 in./sec.), then the windshield 2 was kept nearly completely free from dirt and the air-resistance coefficient $c_w$ was reduced by approximately 30%. With the arrangement according to the present invention of the air-discharge aperture, one therefore realizes a smaller air resistance of the vehicle (which in the tests was exposed to an air blast with a velocity of about 100 km./hour).

Pressure measurements on models of vehicles demonstrated that the smaller air resistance can be tracked back to a reduction of the pressure peaks at the vehicle contour. The reduction of the air resistance of the construction according to the present invention makes it possible, for example, to compensate far-reachingly for the energy necessary for the driving power of an axial blower suitable for high stream or flow velocities for purposes of blowing out air in front of the windshield. The present invention therefore permits it, as shown in FIG. 7, to blow away upwardly in front of the windshield the air flowing against the vehicle, whence to prevent a contact of dust and dirt with the windshield and additionally, depending on the type of vehicle construction on the driving velocity, to provide at least a part of the energy necessary for the blower 12 by a reduction of the air resistance coefficient.

While I have shown and described several embodiments of the present invention, it is understood that the same is not limited thereto but is susceptible of numerous changes and modifications as known to a person skilled in the art, and I therefore do not wish to be limited to the details shown and described herein only for illustrative purposes but intend to cover all such changes and modifications.

I claim:

1. In a motor vehicle body including body wall means, body floor means, windshield means and a body structure disposed in front thereof, the improvement comprising air-flow means for effectively protecting at least one of the two first-mentioned means against soiling by road dirt and dust, including aperture means located in the body forward of said means to be protected and air-guide channel means in communication with said aperture means, said body floor means including a recessed step portion, said air-guide channel means terminating rearward of said recessed step portion of said body floor means, wherein vacuum is created during forward motion of the vehicle, whereby the airstream normally directed at said windshield means when the motor vehicle is in forward motion is deflected.

2. A motor vehicle body according to claim 1, further comprising blower means disposed within said air-guide channel means for enhancing air-flow therethrough.

3. The improvement according to claim 1, wherein two air-guide channel means arranged laterally within the body are each in communication with a respective inlet aperture means, the two inlet aperture means being located within the area of the front end of the body, and further including heat-exchanger means in each air-guide channel means serving the purpose of cooling the engine cooling water.

4. The improvement according to claim 3, further comprising additional air-guide channel means for venting and heating the vehicle interior space, and means including selectively operable closure means operatively connecting said first-mentioned air-guide channel means with said additional air-guide channel means.

5. The improvement according to claim 1, further comprising heat-exchanger means in the air-guide channel means, and additional air-guide channel means for venting and heating the vehicle interior space and operatively connected with said first-mentioned air-guide channel means by way of selectively actuatable closure means.

6. The improvement according to claim 5, further comprising blower means in the air-guide channel means for assisting the air flow therethrough.

7. The improvement according to claim 6, wherein an additional air stream is blown through the aperture means in the direction toward the means to be protected.

8. In a motor vehicle body including body wall means, windshield means and a body structure disposed in front thereof, the improvement comprising air-flow means for effectively protecting at least one of the two first-mentioned means against soiling by road dirt and dust, including aperture means located in the body forward of said means to be protected and air-guide channel means in communication with said aperture means, whereby the airstream normally directed at said windshield means when the motor vehicle is in forward motion is deflected, wherein two air-inlet aperture means are provided in front of said windshield means, said air-guide channel means in communication therewith extending into the body in an approximately V-shaped manner downwardly to a common discharge channel means which widens progressively in the direction toward the vehicle body floor.

9. A motor vehicle body according to claim 8 wherein the discharge channel means terminates rearward of a recessed step at the body floor.

10. A motor vehicle body according to claim 9, further comprising blower means within said air-guide channel means for enhancing air flow therethrough.

References Cited

UNITED STATES PATENTS

| 1,865,675 | 7/1932 | Cavanaugh. | |
| 2,022,833 | 12/1935 | Welch | 296—91 |
| 2,133,927 | 10/1938 | Riel | 296—91 |
| 2,223,378 | 12/1940 | Martin | 296—91 |

FOREIGN PATENTS

| 827,294 | 1/1938 | France. |
| 1,374,747 | 8/1964 | France. |

BENJAMIN HERSH, Primary Examiner

J. A. PEKAR, Assistant Examiner

U.S. Cl. X.R.

296—1